United States Patent [19]

Alsenz et al.

[11] Patent Number: 4,537,038
[45] Date of Patent: Aug. 27, 1985

[54] METHOD AND APPARATUS FOR CONTROLLING PRESSURE IN A SINGLE COMPRESSOR REFRIGERATION SYSTEM

[76] Inventors: Richard H. Alsenz, 2402 Creek Meadow, Missouri City, Tex. 77459; Roger C. Ansted, 7842 Kendalia, Houston, Tex. 77036

[21] Appl. No.: 373,626

[22] Filed: Apr. 30, 1982

[51] Int. Cl.³ .................................... G05D 23/32
[52] U.S. Cl. ...................... 62/118; 62/158; 62/231; 417/12
[58] Field of Search ............ 62/228.3, 231, 118, 62/158; 361/22; 417/12

[56] References Cited

U.S. PATENT DOCUMENTS

| | | | |
|---|---|---|---|
| 3,101,432 | 8/1963 | Adams | 62/158 X |
| 3,127,754 | 4/1964 | Mobarry | 62/158 |
| 3,636,369 | 1/1972 | Harter | 62/158 X |
| 4,135,860 | 1/1979 | Nederkassel | 417/12 |
| 4,142,375 | 3/1979 | Abe et al. | 361/22 X |

*Primary Examiner*—William E. Wayner
*Attorney, Agent, or Firm*—Arnold, White & Durkee

[57] ABSTRACT

Method and apparatus are disclosed for controlling the pressure in a single compressor refrigeration system, comprising a timer for establishing a selected time period functionally related to the compressor on-off cycle, a pressure detecting means for establishing and detecting an operating suction pressure range in the system for determining when upper and lower limits of the operating pressure range have been exceeded, means for generating a compressor turn-on signal in response to exceeding the upper limit of the operating pressure range, means for generating a compressor turn-off signal in response to exceeding the lower limit of the operating pressure range, and control means receiving the compressor turn-on signal for applying the turn-on signal to the compressor in response to the suction pressure exceeding the operating pressure range upper limit, the control means receiving the compressor turn-off signal and cooperating with the timer for preventing the application of the turn-off signal to the compressor only if the established time period has not elapsed. In some applications, the system may include a second timer for establishing a selected turn-on delay time period for cooperating with the control circuit and preventing the application of the turn-on signal to the compressor for the turn-on delay time period.

7 Claims, 8 Drawing Figures

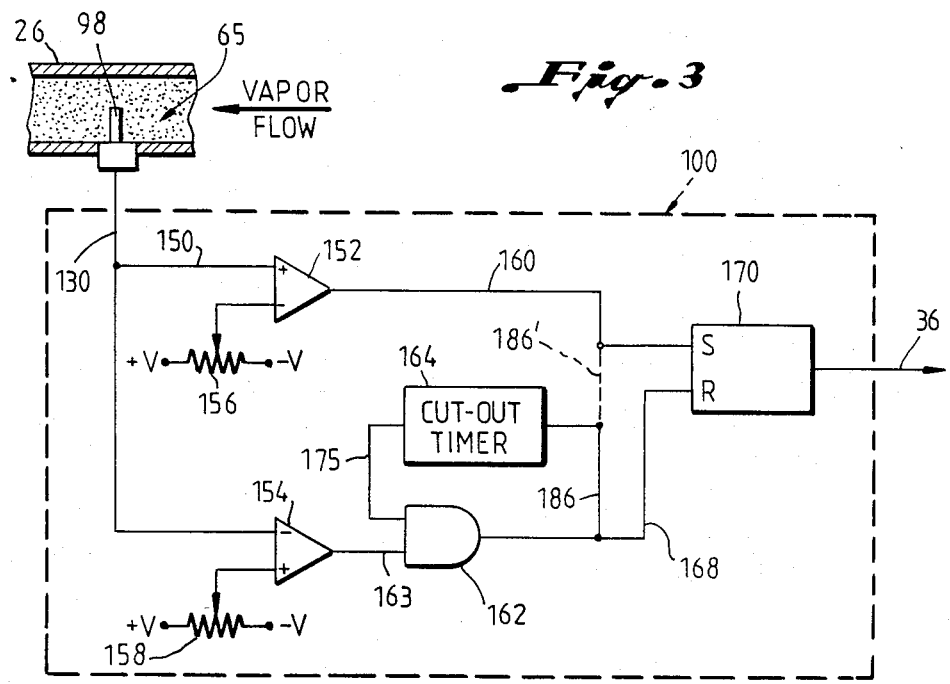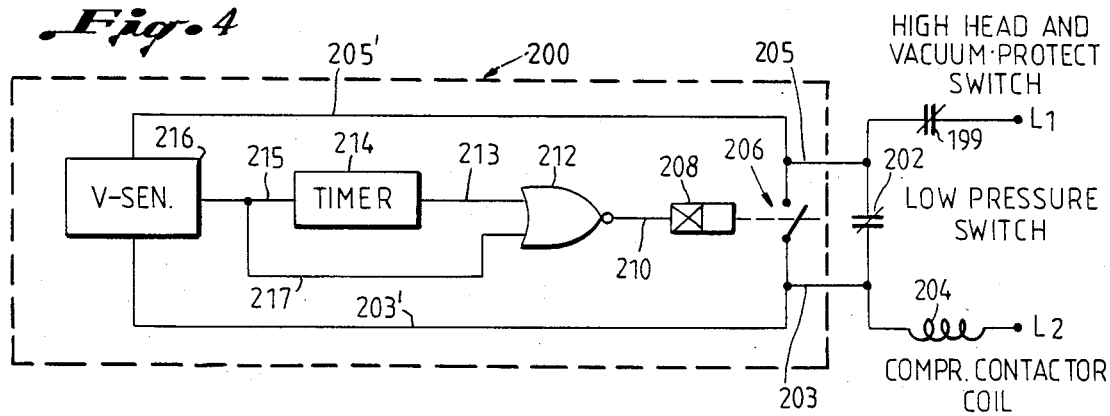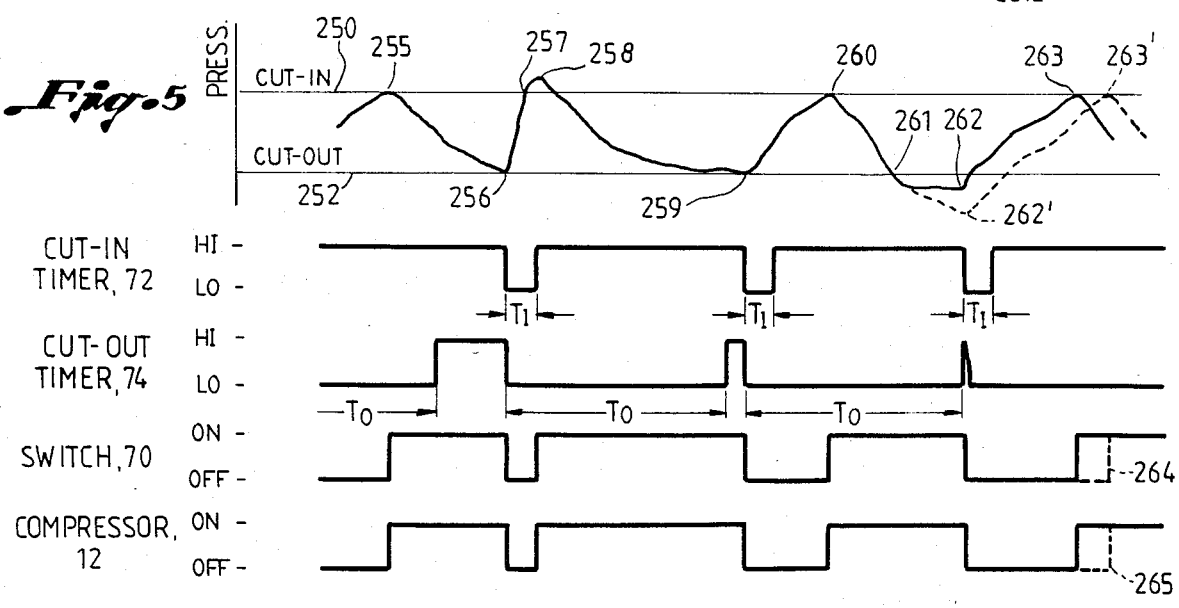

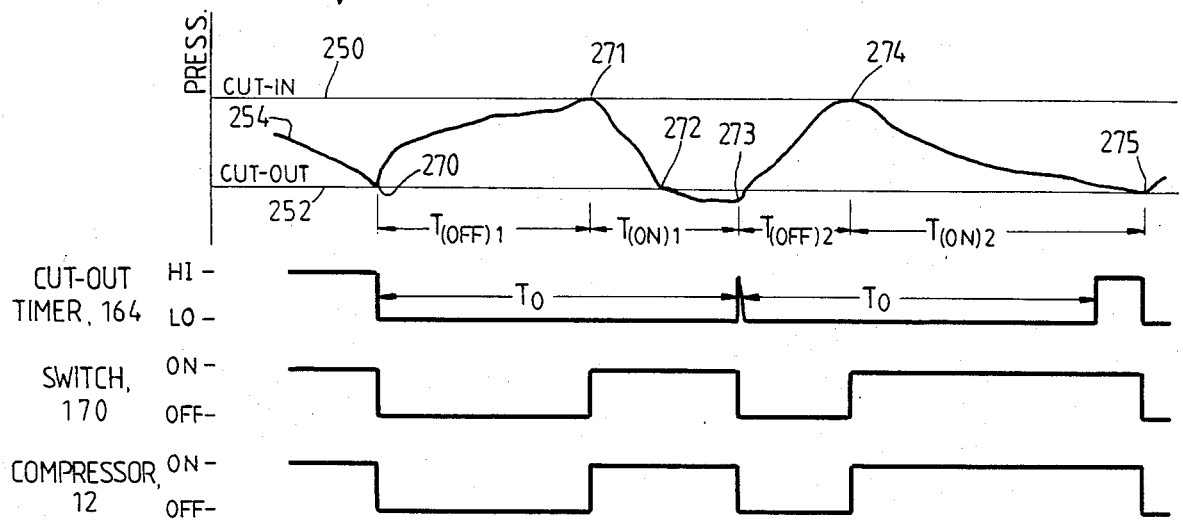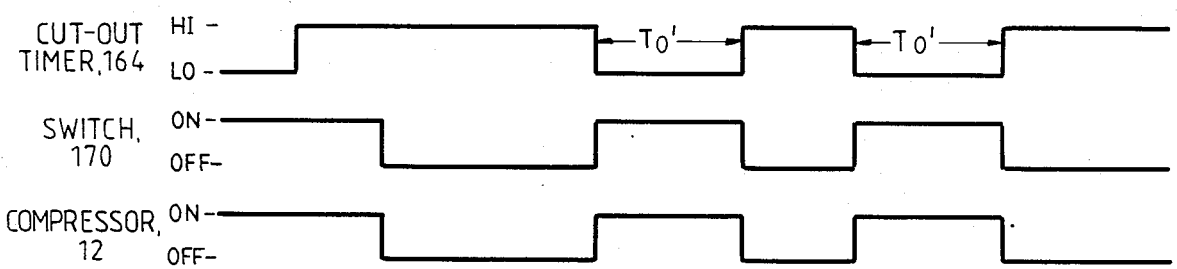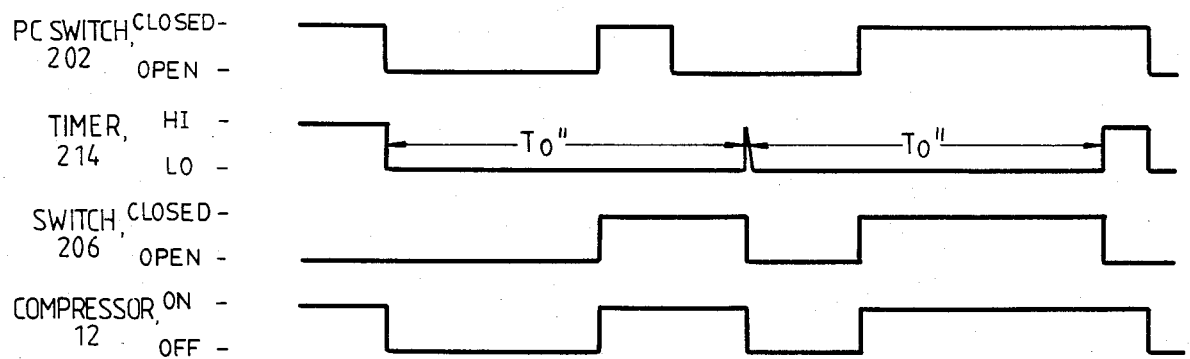

METHOD AND APPARATUS FOR CONTROLLING PRESSURE IN A SINGLE COMPRESSOR REFRIGERATION SYSTEM

TECHNICAL FIELD

This invention relates to a method and apparatus for controlling evaporator pressure in a single compressor refrigeration system. The invention permits closer control of the operating suction pressure range of the system, thus permitting closer control of the refrigerated case temperatures and greater efficiency in the cycling of the compressor motor to save energy.

In the operation of a refrigerator system, a suitable low pressure must be maintained in the evaporator coil to permit evaporation of the refrigerant at a low temperature. Therefore, it is conventional to automatically control the compressor motor based on pressure in the evaporator coil. Such a pressure-type compressor motor control is generally referred to as a "low" pressure control, since it operates on the low pressures generally associated with the evaporator. Such controls are generally mechanical controls that are bellows-operated and respond to pressure differentials in the suction line from the evaporator to the compressor.

The bellows of the control is interconnected to the suction line by means of a suitable tubing. As the evaporator warms, the low-side pressure increases, the bellows expands, a switch associated with the bellows closes and the compressor motor is started. When the pressure (and temperature) becomes low enough, the bellows assembly contracts, the switch opens and the compressor motor is automatically shut off. The upper pressure level at which the control can be set to start the compressor is referred to as the "cut-in" pressure level. The lower pressure level at which the control can be set to shut off the compressor motor is referred to as the "cut-out" pressure level. By use of springs and screw adjustments, the cut-in and cut-out pressures can be adjustably set, within a specified range, to operate the evaporator withing a desired range to achieve desired temperature control.

The refrigerant pressure in an evaporator coil translates closely to the temperature of the evaporator and the evaporator temperature closely approximates the temperature of the refrigerated case product compartment when the compressor is turned off and not running. Since there is a minmal pressure drop between the evaporator and the pressure sensing device when the compressor is not operating, the temperature of the product compartment, after a short adjustment time after the compressor is turned off, can be closely estimated by observing the suction pressure with the compressor turned off. The pressure corresponding to the desired temperature of the product compartment may then be selected as the cut-in pressure level.

Setting the cut-out pressure level has been a real problem for the conventional pressure controls used in refrigeration systems. The problem with selecting the proper cut-out setting is that the proper setting corresponding to a desired product compartment temperature varies greatly from system to system. The factors that will affect the proper cut-out setting are: the capacity of the compressor, the pressure drop in the suction line between the evaporator coil and the compressor, the efficiency of the expansion valve in feeding refrigerant into the evaporator coil, the condensing pressures and the current heat transfer characteristics of the evaporator coil. As may be readily noted, these characteristics often vary and change with changes in ambient operating conditions and with the age and condition of the equipment in the refrigerating system.

It the cut-out setting is set too low, then the product compartment temperature will be operating colder than necessary, and, consequently, the refrigeration system will waste energy. On the other hand, if the cut-out setting is set too high, the compressor will pull the suction pressure down to a lower level too quickly and cause excessive compressor cycling.

As a consequence of the problems above described, the manufacturer's recommended cut-out pressure setting for the evaporator coil and the refrigerated cases is generally used only as a starting point by the refrigeration system installer and/or serviceman. The cut-out pressure setting is then adjusted according to individual system requirements. Because of the problems associated with setting the cut-out pressure level as discussed above, it is common to see cut-out settings which are set too low and the prodduct compartments operating at temperatures colder than necessary, just to prevent excessive compressor cycling from occurring. These problems also cause many refrigeration systems to be set at condensing pressures that are much warmer than the ambient conditions would allow, because increasing the pressure capacity resulting from the reduced condensing pressures will significantly alter the required cut-out pressure settings and require frequent readjustment of the low-pressure control.

BACKGROUND ART

Because of the problems discussed above, it is common for installers to set the cut-out pressure setting too low and cause the product compartment to operate at temperatures colder than necessary, just to prevent excessive compressor cycling from occurring. These problems also cause systems to be installed and set to operate at condensing pressures that call for temperatures much warmer than the ambient conditions would ordinarilyallow. However, increasing the capacity of the system resulting from the reduced condensing pressures will significantly alter the required cut-out pressure settings and require frequent readjustment of the low pressure control.

Patents which are typical of prior art for mechanically or electromechanically controlling the operation of compressors in a refrigeration or cooling system include the following U.S. Pat. Nos: 3,885,938; 3,828,152; 3,719,057; 3,581,519; 3,580,006; 3,552,137; 3,513,662; and 3,377,816. However, all of the baove patents are directed to either parallel or cascaded multiple compressor systems.

DISCLOSURE OF THE INVENTION

The present invention remedies the problems of the prior art by providing a method of controlling the system refrigerant pressure in a single refrigeration system, comprising the steps of: establishing a selected time period functionally related to the compressor on-off cycle, establishing an operating suction pressure range, detecting the suction pressure in the system for determining when upper and lower limits of the operating pressure range have been exceeded, applying a compressor turn-on signal to the compressor in response to exceeding the upper limit of the operating pressure range, operating the compressor in the system in response to applying said turn-on signal, determining when the lower limit of the operating pressure range has been exceeded for generating a compressor turn-off signal, and preventing the application of the turn-off signal to the compressor only if the established time period has not elapsed.

According to another principle of the invention, the following apparatus for controlling the system refrigerant pressure in a single refrigeration compressor system is provided, comprising: timing means for establishing a selected time period functionally related to the compressor on-off cycle, means for establishing and detecting an operating suction pressure range in the system for determining when upper and lower limits of the operating pressure range have been exceeded, means for generating a compressor turn-on signal in response to exceeding the upper limit of the operating pressure range, means for generating a compressor turn-off signal in response to exceeding the lower limit of the operating pressure range, switch means receiving the compressor turn-on signal for applying the turn-on signal to the compressor in response to the suction pressure exceeding the operating pressure range upper limit, the switch means receiving the compressor turn-off signal and cooperating with the timing means for preventing the application of the turn-off signal to the compressor only if the established time period has not elapsed.

Accordingly, one primary feature feature of the present invention is to provide method and apparatus for controlling the system refrigerant pressure in a single refrigeration compressor system that eliminates the problems associated with setting cut-out pressure levels.

Another primary feature of the present invention is to provide method and means for controlling the system refrigerant pressure in a single refrigeration compressor system that permits more consistent product compartment control.

Yet another major feature of the present invention is to provide method and apparatus for controlling the system refrigerant pressure in a single refrigeration compressor system that forces the system to operate to the required pressure before the timing means will allow the compressor to be turned off for maintaining proper refrigerated case temperatures.

Still another major feature of the present invention is to provide method and apparatus for controlling the system refrigerant pressure in a single refrigeration compressor system that permits system condensing pressures to be dropped below that customarily used for yielding significant energy savings.

Another major feature of the present invention is to provide method and apparatus for controlling the system refrigerant pressure in a single refrigeration compressor system that provides on-off time delays for preventing compressor short cycling.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the Drawings

FIG. 3 is a simplified block diagram schematic of second and third embodiments of the pressure control according to this invention.

FIG. 4 is a simplified block diagram schematic of a fourth embodiment of the pressure control according to this invention.

FIG. 5 is a combined graphical representation of the system refrigerating fluid pressure vs. time and a signal timing diagram for the embodiment of the invention disclosed in FIG. 2.

FIGS. 6A, 6B and 6C are combined graphical representations of the system refrigerating fluid pressure vs. time and a signal timing diagram for the embodiments of the invention disclosed in FIGS. 3 and 4, respectively.

BEST MODE FOR CARRYING OUT THE INVENTION

Figure 1:
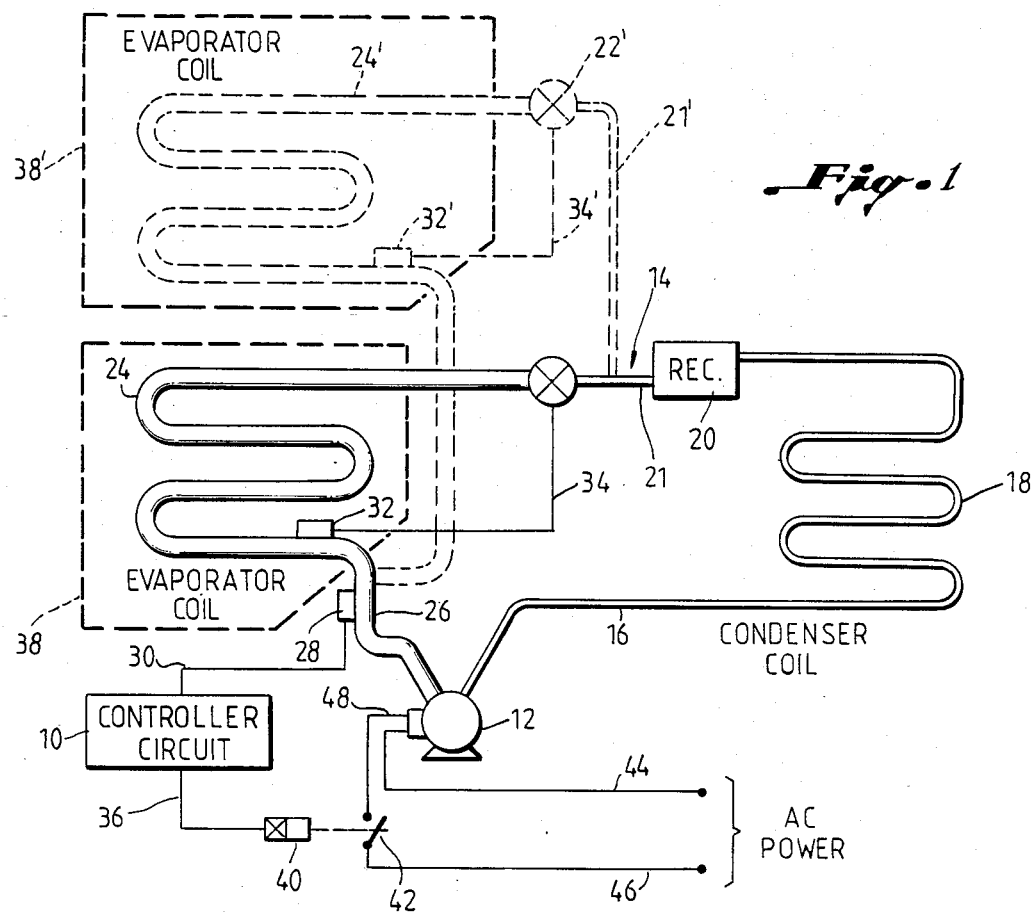
FIG. 1 is a simplified schematic of a single refrigerator compressor system that may have plurality of parallel-piped evaporator coils for cooling a plurality of refrigerated cases and including the refrigerant system pressure control according to this invention.

Referring to FIG. 1, the system refrigeration pressure control 10 is shown disposed in a single refrigeration compressor system 14 consisting of a single compressor 12 for compressing and discharging compressed pressurized refrigerant vapor through a discharge line 16 to a condenser coil 18 where the pressurized refrigerant vapor is condensed to a liquid and then delivered to a receiver vessel or tank 20. From the receiver 20, the liquid refrigerant flows through line(s) 21(21') (if there are multiple parallel evaporator coils) to expansion valve(s) 22(22'), which are typically thermostatic expansion valves responding to the temperature in the suction line 26 as sensed by a temperature probe 32 interconnected to valve 22 by means of line(s) 34(34'). The temperature sensed by probe 32 controls the action of the expansion valve(s) 22(22') in a conventional manner.

The liquid refrigerant is metered by expansion valve(s) 22(22') into the evaporator coil(s) 24(24') where the liquid refrigerant, encountering the raised temperatures and lowered pressures of the evaporator coil, is vaporized and absorbs heat from the evaporator coil. This cooling action of evaporator coil(s) 24(24') cools the product compartments of the refrigerated cases 38 and 38'. The hot vaporized refrigerant from the coils 24(24') is drawn through a common suction line 26 to the inlet port of the single compressor 12 for a compression and recycling. The number of coils 24 and cases 38 in the system will vary according to the refrigerating or cooling system design. In FIG. 1, one evaporator coil is identified as coil 24 for cooling case 38, and any number of parallel piped coils are represented by the coil 24' (shown in dotted lines) and the refrigerant case 38' (also shown in dotted lines) In the remainder of this specification, only the coil 24 will generally be referred to in describing the system and invention operation. However, it is to be understood that such description includes any number of parallel-piped evaporator coils as may be found in typical single compressor systems.

A pressure sensing device or means 28 is attached in the suction line 26 and detects the refrigerant vapor pressure within line 26 for determining when selected upper and lower operating pressure limits have been exceeded as will hereinafter be more fully explained. The pressure detected by means 28 is communicated to the pressure controller circuit 10 by conductor 30. The output of controller 10 is applied through conductor 36 to the contactor coil 40 of the compressor power relay 42. The relay 42 controls the application of AC electrical power to the motor of compressor 12 from AC inputs 44 and 46. Controller 10 applies the necessary compressor "turn-on" and "turn-off" signals to the contactor relay 40 for cycling the compressor 12 to control the system refrigerant pressure.

As hereinabove earlier described, the control of tempperature in the refrigerated case can be dramatically improved over the control achieved by pressure controls conventionally used in signal compressor applications. Since refrigerant pressure in the evaporator coil 24 translates directly to temperature in the product compartment of case 38, the coldest refrigerated fixture or case 38 in the system can be determined by observing the suction pressure in the system with the compressor 12 turned off. There is minimal pressure drop in the suction line when the compressor is shut off, and therefore, the pressure that translates into the warmest desired discharge air temperature in one of fixtures 38 may be selected as the system "cut-in" pressure. The system "cut-out" pressure may conveniently be set at the manufacturer's recommended "cut-out" pressure or higher, since control 10 will prevent any short cycling of compressor 12.

Figure 2:
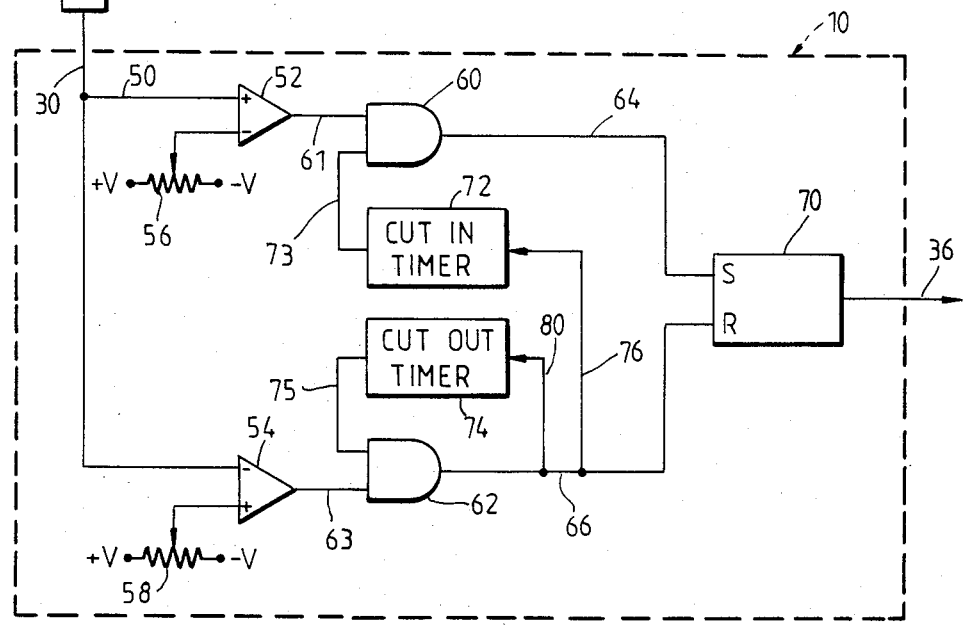
FIG. 2 is a simplified block diagram schematic of one embodiment of the pressure control according to this invention.

Referring now to FIGS. 1, 2 and 5, the operation of the pressure control circuit 10 will be described in greater detail. The pressure detecting means 28 may conveniently take the form of a pressure transducer shown sealingly inserted into the refrigerant vapor flow 65 in suction line tubing 26. Pressure transducer 28 may be any conventional pressure detecting means for generating an electrical signal representative of the pressure within line 26. The pressure signal from transducer 28 is applied through conductors 30 and 50 to the positive and negative inputs, respectively, of the "cut-in" and "cut-out" comparator circuits 52 and 54, respectively. To set a selected "cut-in" pressure for the system, a voltage potential is applied through a voltage varying means, such as a potentiometer 56, to the negative input of the comparator circuit 52. Similarly, a voltage is applied through a voltage varying means, such as a potentiometer 58, to the positive input of the comparator circuit 54 to set a selected "cut-out" pressure for the system.

Comparator circuit 52 compares the selected refrigerating system "cut-in" pressure (set by potentiometer 56) with the suction line pressure continuously detected by pressure transducer 28 and produces a "turn-on" signal, when the measured pressure in suction line 26 exceeds the predetermined "cut-in" pressure. Similarly, comparator circuit 54 compares the predetermined system "cut-out" pressure (set by potentiometer 58) with the pressure detected in the suction line 26 by the transducer 28 and produces a "turn-off" signal when the detected system suction pressure exceeds the selected "cut-out" pressure. The combination of transducer 28, potentiometers 56 and 58, and the comparators 52 and 54 further comprise means for establishing and detecting an operating suction pressure range for the system and for determining when upper (cut-in) and lower (cut-out) limits of the operating pressure range have been exceeded. The comparator 52 also functions as a means for generating a compressor turn-on signal in response to exceeding the upper limit of the operating pressure range. The comparator 54 also functions as a means for generating a compressor turn-off signal in response to exceeding the lower limit of the operating pressure range.

The turn-signal from comparator 52 is applied through conductor 61 as one input to an AND gate 60. The other input to AND gate 60 is connected to the output of a cut-in timer 72 through conductor 73. The output of AND gate 60 is applied through conductor 64 to the "set" input of solid-state switch 70. Similarly, the turn-off signal from comparator 54 is applied through conductor 63 as one input to an AND gate 62. The other input to the AND gate 62 is connected to the output of a cut-out timer 74 through conductor 75. The output of the AND gate 62 is applied through conductor 66 to the "reset" input of switch 70. The inputs of timers 72 and 74 are connected to the AND gate 62 output lead 66 by means of conductors 76 and 80, respectively. The switch 70 output is applied through conductor 36 to the contactor solenoid coil 40 as hereinabove described with respect to FIG. 1.

The operation of circuit 10 can be more readily explained by referring now to the diagrams of FIG. 5. The graphical representation of system suction pressure vs. time is a hypothetical but typical operating sequence that may be encountered in the field. The selected "cut-in" and "cut-out" pressure limits established for the system are represented by the cut-in and cut-out lines identified as 250 and 252, respectively. The trace of the system suction pressure as it varies with time is identified as 254. Assuming that the cut-in timer 72 is not activated (its output signal level is at a logic "high" level), and that the cut-out timer 74 is activated and is completing its timing sequence (its output signal level is at a logic "low" level), the switch 70 will be in a a reset condition, thus insuring that compressor 12 is turned off. However, when the suction pressure rises in the system and finally reaches the cut-in pressure limit at point 255, comparator 52 detects that the upper pressure limit (the cut-in pressure 250) has been exceeded and generates a voltage signal as a turn-on signal applied as a logic high input to AND gate 60. Since the gate was enabled with the logic high input from timer 72, the turn-on signal from the comparator 52 is passed by AND gate 60 and applied through conductor 64 to the set input of switch 70, thus enabling the switch and applying a "turn-on" signal to the compressor contactor coil 40 through conductor 36. Relay contacts 42 close and compressor 12 is actuated. Note that the cut-out timer 74 has been in its timing sequence during the above described turn-on sequence, and returns to a logic high output upon the expiration of $T_o$. The timer 74 output then returns to a logic high state, and AND gate 62 is enabled.

After compressor 12 has been turned on, the suction pressure in the system begins to fall, until the pressure exceeds the cut-out pressure level 252 as at 256. When comparator 54 detects that the cut-out pressure has been exceeded at point 256, a logic high voltage signal is applied to the enabled AND gate 62, which in turn applies a turn-off signal through conductor 66 to reset switch 70 and turn off the compressor 12. The output of AND gate 62 is also applied as reset inputs to the cut-in and cut-out timers 72 and 74, both of which are activated to begin their respective timing sequences, $T_i$ and $T_o$. The cut-in timer 72 runs for a relatively short time period $T_i$, as compared to the longer timing sequence of the cut-out timer 74 as shown by $T_o$. The cut-in time period $T_i$, is provided to prevent the compressor 12 from short cycling in the event the pressure rises too quickly after the compressor was last turned off, as may be seen when the suction pressure trace rises above the cut-in pressure limit 250 at 257. The compressor will not be cycled on until the cut-in time period $T_i$, has elapsed as shown at 258. When the time sequence $T_i$, has elapsed, the output of timer 72 returns to a logic high state, thus enabling AND gate 60 once again. With the enabling of AND gate 60, and the prior generation of a turn-on signal from comparator 52 (the suction pressure exceeding the cut-in limit 250 at 257), the turn-on signal is passed by AND gate 60 and applied to set switch 70 at point 258, thus turning on the compressor 12.

At the same time that timer 72 was cycled on, the cut-out timer 74 was actuated and its output drops to a logic low state to disable AND gate 62 and begin the time period $T_o$. When the timer 74 completes its timing sequence $T_o$, the output of timer 74 returns to a logic high output, thus again enabling AND gate 62. Meanwhile, with compressor 12 running, the system suction pressure has fallen until the suction pressure exceeds the lower or cut-out limit 252 as at 259. When the suction pressure exceeds the cut-out pressure, the comparator 54 signal is passed by the enabled AND gate 62 to switch 70, resetting switch 70 and turning off the compressor 12. The turn-off signal from AND gate 62 applied through conductor 66 is also applied as input signals to start the timers 72 and 74. The timing sequence $T_i$ of timer 72 starts and stops while the timing sequence $T_o$ of timer 74 is in progress.

If the suction pressure rises to the cut-in pressure level 250 as shown at 260, the turn-on time period $T_i$ will have elapsed but the turn-off time period $T_o$ will not yet have elapsed. With timer 72 producing a logic high output upon its completion of time period $T_i$, the AND gate 60 is again enabled. When the pressure reaches the cut-in level 250 as at 260, the comparator 52 again sends a signal through AND gate 60 to set switch 70, thus turning on the compressor. As the system suction pressure falls with the compressor 12 running, the pressure may fall below the lower pressure limit 252 (exceed the cut-out pressure setting) at 261. However, although comparator 54 produces a signal applied to the AND gate 62, the operation of timer 74 disables the AND gate 62 and prevents the application of a turn-off signal to switch 70. Therefore, the suction pressure may drift below the lower cut-out level 252 as shown, but the comparator 54 is producing a continuous output signal since the suction pressure is continuously exceeding the lower cut-out preesure level. When the time period $T_o$ elapses, the timer 74 output goes to a logic high state and enables AND gate 62, thus applying a turn-off signal to switch 70 to reset the switch and turn off compressor 12 at point 262. As hereinabove described, the timers 72 and 74 are actuated to run through their respective timing sequences, $T_i$ and $T_o$. At point 263, when the suction pressure again exceeds the upper cut-in pressure level 250, the switch 70 will be set and the compressor 12 again turned on for operation.

As hereinbefore described, the control 10 will allow the refrigeration system to be operated at reduced condensing preswhich will alter the typical system suction pressures as shown graphically by the dotted line extension of the suction pressure trace 254 beyond the point 261 where the suction pressure exceeds the cut-out pressure level 252. If the compressor is operating at reduced head pressures as shown, then the pressure at point 262' will be lower than the pressure at point 262 when time period $T_o$ elapses and enables AND gate 62 as above described. The switch 70 will be reset and turn off the compressor 12. The resultant rise in suction pressure, if paralleling the trace 254 between points 262 and 263, will rise to exceed the cut-in pressure level 250 at 263' at a later time to exceed the cut-in pressure level 250 at 263' at a later time. This later time is reflected by the lengthening of the time period that the switch 70 is reset as shown by the dotted line 264, and the increased time period that the compressor 12 is off as reflected by the dotted line 265. This increased off time for compressor 12 when operated at lower ambient temperature conditions can contribute to a substantially increased system efficiency, sometimes up to 30 and 40%

As above described, it has been found that condensing pressures can be allowed to be dropped significantly below that customarily used, since the change in compressor capacity will no longer effect the cut-out pressure setting as in the prior art controls. Lowering the condensing pressure in the system can yield significant energy savings as above described. One technique of achieving such reduced system condensing pressures is to permit the compressor motor room to be operated at reduced temperatures, such as 50 F. instead of the more customary 80 F. Reducing the motor room temperature permits the compressor to operate at the reduced condensing head pressures above described.

In practice, it has been found that convenient time periods for $T_i$ and $T_o$ are 30 seconds and 5.5 minutes, respectively. Of course, any other desirable and practical time periods may be selected for the time periods $T_i$ and $T_o$. The manufacturer's recommended cut-out pressure setting for cases 38 may be utilized, since the setting corresponds to the desired product compartment temperatures under ideal conditions. It is assumed that, unless this temperature is achieved, it is not possible to have the product compartment temperature fall below the recommended temperature. Only when the suction pressure falls below the cut-out level or setting is the compressor 12 allowed to be shut off if the cut-out timer 74 has completed its timing cycle $T_o$, thus permitting the actual temperature of the product compartment 38 to be measured.

For most systems, the cut-out pressure level can be set between the manufacturer's recommended cut-out setting and the selected cut-in pressure setting, since the controller 10 will force the system to operate to a required pressure before the timer 74 will allow the compressor 12 to be turned off, thus maintaining the proper temperatures in case 38.

FIG. 3 discloses two additional embodiments of the pressure control 10 shown in FIG. 2. A pressure sensing device or means 98 is attached in the suction line 26 and detects the refrigerant vapor 65 pressure within line 26 in a manner identical to that discussed above with regard to FIG. 2. The pressure signal from transducer 98 is applied through conductors 130 and 150 to the positive and negative inputs, respectively, of the "cut-in" and "cut-out" comparator circuits 152 and 154, respectively. Comparators 152 and 154 have associated means 156 and 158, respectively, for setting the desired system suction pressure operating range between an upper "cut-in" and a lower "cut-out" pressure levels, comparators 152 and 154 and means 156 and 158 generate "turn-on" and "turn-off" signals in cooperation with such cut-in and cut-out pressures in an identical manner as that hereinabove described with respect to the embodiment disclosed in FIG. 2. However, the output of comparator 152 is applied directly as a set input to the solid-state switch 170 through conductor 160. The cut-in timer and an AND gate associated with the cut-in comparator have been eliminated from the cut-in comparator 152 circuit.

The output of the turn-off comparator 154 is applied as one input to an AND gate 162 through conductor 163. The other input to AND gate 162 is applied from the output of the cut-out timer 164 through conductor 175. The output of the AND gate 162 is applied through conductor 168 to the reset input switch 170 similar to the operation as above described in relation to the embodiment disclosed in FIG. 2. The output of AND gate 162 is also connected as the input to the cut-out timer 164 by conductor 186. Thus, in the embodiment shown, the timer 164 is actuated when a turn-off signal is passed by AND gate 162 and applied to switch 170. In a third embodiment, the input to timer 164 is applied through conductor 186' which is connected to the turn-on comparator output line 160, with the conductor 186 removed. In this embodiment, the timer 164 is actuated when a turn-on signal is applied by comparator 152 to the switch 170.

Referring now to FIGS. 3, 6A and 6B, the detailed operation of the two additional embodiments of the present invention will now be described in detail. The graphical representation of system suction pressure vs. time is again a hypothetical but typical operating sequence similar to that described above in FIG. 5. The selected "cut-in" and "cut-out" pressure limits established for the system are represented by the cut-in and cut-out lines identified as 250 and 252, respectively. the trace of the system suction pressure, as it varies with time, is identified as 254. In the second embodiment of the invention shown in FIG. 3, the circuitry is similar to the first embodiment of FIG. 2, except that the cut-in timer function has been eliminated.

The operation of the second embodiment shown in FIG. 3 can be better understood with reference to FIG. 6A. Assuming that the cut-out timer 164 has completed its timing cycle, $T_o$, the output of the timer will be a logic high signal applied to and enabling the AND gate 162. Switch 170 will be in its set or on state, thus compressor 12 will be running. As the suction pressure falls, it will eventually exceed the cut-out pressure level 252 as at 270, and the comparator 154 will generate a signal applied to the other input to AND gate 162. Since AND gate 162 has been enabled by the high output of timer 164, the gate 162 passes a signal via conductor 168 to reset switch 170 to an off condition, thus turning off the compressor 12. The signal from AND gate 162 is also applied through conductor 186 to the input of timer 164. Timer 164 is actuated and begins its selected timing cycle, $T_o$, with its output applied to one input of the AND gate 162 through conductor 175. The output of timer 164 drops to a logic low signal and disables gate 162.

With the compressor 12 off, the suction pressure in the system rises until it exceeds the cut-in pressure level 250 at 271. Comparator 152 generates a signal that is applied directly to the set input of the switch 170, and in turn applying a turn-on signal to the compressor motor switch solenoid 40 to close contacts 42 and turn on the compressor 11. The suction pressure in the system will then decrease, depending on the refrigerator load. Assuming that the cooling load is light, the suction pressure may decrease rapidly to exceed the lower cut-out level 252 at 272. The comparator 154 will then generate a signal applied to one input of the AND gate 162. Since AND gate 162 is disabled because of the logic low input from timer 164, there will be no output from AND gate 162, and switch 170 remains in the same state with compressor 12 continuing to run.

However, when the timing sequence $T_o$ elapses, the timer 164 output goes to a logic high state, thus enabling the AND gate 162 and applying a signal to reset the switch 170 and turning off the compressor 12. The output signal from AND gate 162 also immediately restarts timer 164. The suction pressure begins to rise again until it exceeds the high cut-in pressure level 250 at 274. The switch 170 is again set to its on condition and compressor 12 is turned on as above described. The timer 164 completes its timing sequence $T_o$ and the timer 164 output applied to one input of AND gate 162 goes to a logic high state and enables the gate. The AND gate 162 will then apply the next received comparator 154 signal to switch 170 when the suction pressure falls below the cut-out pressure level 252 as occurs at 275. The compressor cycling sequence again be repeated as above described.

In FIG. 3, if the input lead 186 to the cut-out timer 164 is disconnected from the AND 162 gate output lead 168, and lead 186' is substituted to interconnect the timer 164 input to the comparator 152 output conductor 160, the timer 164 will now be reset and begin its timing sequence upon the occurence of the cut-in pressure level being reached. This embodiment is different than the embodiments above described in which the timing sequence for timer 164 begins upon the occurrence of the cut-out pressure level being reached. The signal timing sequences $T_o'$ in this third embodiment are shown in FIG. 6B. Assuming that the timer 164 output has returned to a logic high state (reflecting that the timer has completed its timing sequence $T_o'$), and the switch 170 is in its set or on condition, then the compressor 12 will be turned on. When the suction pressure falls to the cut-out pressure level 252 as at 270, the comparator 154 turn-off signal will be applied to reset the switch 170 and turn off compressor 12. The output of the timer 164 remains at a logic high state since the timer is off. When the suction pressure rises to exceed the cut-in pressure level 250 at 271, the comparator 152 turn-on signal is applied to switch 170 to set the switch and turn-on the compressor 12. At the same time, the comparator 152 output is applied as an input to the timer 164 through lead 186', thus activating the timer and beginning the selected timing sequence $T_o'$.

The suction pressure in the system may drop rapidly to exceed the cut-out level 252 at 272, and comparator 154 will generate a cut-out signal that is applied as one input to the AND gate 162. However, since the gate 162 has been disabled when the timer 164 was turned on and is still in its timing sequence $T_o'$, the gate 162 will not pass a signal to reset the switch 170. The compressor continues to run and the suction pressure drifts lower. When the timer 164 has completed its selected timing sequence $T_o'$, the timer output returns to a logic high state, and since the input from comparator 154 is already present, the AND gate 162 is enabled and applies a signal to reset switch 170 and apply a turn-off signal to the compressor 12. The timer 164 will be reset and the switch 170 set when the suction pressure again exceeds the cut-in level 250 at 274, and the switch 170 will be reset when the cut-out pressure level 252 is exceeded as at 275. As can be seen from the above de- the timing sequence $T_o'$ is always a selected fixed time period that is started upon the occurrence of the suction pressure exceeding the cut-in level. The compressor is forced to run for the entire time period $T_o'$, even if the pressure falls below the cut-out pressure level.

As can be seen from an inspection of FIGS. 6A and 6B, while time periods $T_o$ and $T_o''$ are fixed, the actual on-off cycle times for the compressor 12 vary. During the two cycles between points 270 and 275, the compressor will be off during T(off)1 (point 270 and 271) and on during T(on)1 (point 271 to 273), while the compressor will again be off during T(off)2 (point 273 to 274) and on during T(on)2 (point 274 to 275). It can be seen that during the run time T(on)1 that the suction pressure falls rapidly and actually exceeds the lower cut-out limit 252 at 272, but since the time period $T_o$ has not yet elapsed, the compressor is not shut off. The compressor 12 continues to run and forces the suction pressure lower than the cut-out pressure limit which forces the product case to become too cold during the time period between points 272 and 273. On the next cycle, however, T(off)2 is much shorter than the time period T(off)1 and the suction pressure does not exceed the cut-out level 252 until after the time period $T_o$ has elapsed, and T(on)2 will be much longer than T(on)2. In this way the on-off times are averaged over a long time period, and the pressures are averaged over a larger number of cycles, thus averaging the temperature of the product compartment and obtaining a more consistent temperature range.

The fourth embodiment of the invention shown in FIG. 4 is a simplified version of the second embodiment above described in connection with FIG. 3. However, this embodiment does not use the pressure transducers 28 and 98 of the embodiments shown above, but utilizes the existing conventional low pressure switch that is installed in such compressor systems to control the cut-in and cut-out pressure levels in a conventional manner. The control circuit 200 would be used with a single compressor system as shown in FIG. 1, with the exception as noted above where the conventional low pressure switch already installed in the conventional system is utilized. In this embodiment, the cycling of the compressor 12 is virtually identical to the operation of the second embodiment disclosed in FIG. 3.

A high head pressure and vacuum protect switch 199 is shown in a normally closed condition and connected in series with a conventional low pressure switch 202 and the compressor contactor coil 204 between power lines L1 and L2 of the AC electrical power service for the motor of compressor 12. Low pressure switch 202 can be mechanically "set" to operate between selected "high" and "low" pressure levels. When the section pressure rises above the high setting, the switch closes, and, conversely, when the suction pressure falls below the low pressure setting, the switch opens. This conventional pressure control switch can be utilized for detecting when the suction pressure exceeds the selected "cut-in" and "cut-out" pressure levels. The pressure control 202 high and low settings can be adjusted to correspond to the selected cut-in and cut-out pressure levels for the system.

A solenoid switch 206 is connected in parallel across pressure switch 202 by means of conductors 203 and 205. Switch 206 is controlled by solenoid coil 208. The voltage across pressure switch 202 is also applied to a conventional voltage sensing circuit 216 through conductors 203, 203', 205 and 205'. The voltage sensing circuit 216 is a conventional sensing circuit that senses the line voltage appearing across switch 202 or the solenoid switch 206. If both the pressure switch 202 and the solenoid switch 206 are open, the line voltage is sensed by circuit 216 which generates a logic high signal applied to timing circuit 214 through conductor 215, and as one input to a NOR gate 212 through conductor 217. However, if either pressure switch 202 or solenoid switch 206 are closed, circuit 216 will not sense a voltage drop and will generate a logic low signal output. The output of timer 214 is applied through line 213 as the second input to the NOR gate 212. The output of the NOR gate is applied through conductor 210 to the solenoid coil 208 for operating the switch contacts 206.

The operation of the embodiment of FIG. 4 can be best described with reference to FIGS. 4 and 6C. In operation, as long as the low pressure switch 202 is closed, the cut-in pressure level has been reached and the compressor 12 will run. When the cut-out pressure level is reached as at point 270 in FIG. 6C, the pressure switch 202 opens, thus turning off the compressor 12, assuming that the solenoid switch contacts 206 are open. The line voltage appearing across pressure switch 202 will also appear across the inputs to the voltage sensing circuit 216. The voltage sensing circuit 216 will apply a logic high signal to the timer 214 and to the NOR gate 212 through conductors 215 and 217, respectively. The high logic state input to the NOR gate 212 from the voltage sensing circuit 216 is applied as a low voltage signal to the solenoid coil 208, thus maintaining the switch contacts 206 open. Timer 214 is energized and begins its timing sequence $T_o''$.

When the suction pressure rises and exceeds the cut-in pressure as at 271, the pressure switch 202 recloses, and the compressor 12 is restarted. The absence of line voltage across the pressure switch 202 is sensed by circuit 216 and its output goes to a low logic state. The low logic signal applied as an input to the NOR gate 212 is converted to a positive turn-on signal applied to the coil 208, energizing the coil and closing contacts 206 in parallel across pressure switch 202. However, when the pressure drops to exceed the cut-out pressure level 252 at 272, the pressure switch 202 will open, but since switch contacts 206 are closed, the compressor 12 will be forced to continue to run until the timing cycle $T_o'$ elapses at point 273. When timer 214 completes timing cycle, the output of the timer will go to a logic high level applied to the NOR gate 212, which in turn will apply a low voltage signal to the coil 208, deenergizing the coil and opening the switch contacts 206. When contacts 206 open, and with the pressure switch 202 already open the compressor will be turned off.

As soon as both pressure switch 202 and contacts 206 open, line voltage will appear across both switches and across the voltage sensing circuit 216. The circuit 216 will sense the voltage and apply an output signal to the timer 214 and NOR gate 212 as above described. The timer will immediately be reset and begin a new timing cycle $T_o'$. When the suction pressure again reaches the cut-in pressure level at 274, the pressure switch 202 closes and the coil 208 is energized as hereinabove described. With coil 208 energized, the switch contacts 206 are closed and the compressor will again be turned on. The switch contacts 206 will be opened when the timer 214 completes its timing cycle, but the compressor 12 will not be turned off until the suction pressure again drops below the cut-out pressure level 252 as at 275. As may be seen by comparing the signal timing diagrams of FIGS. 6A and 6C, the timing cycles $T_o$ and $T_o'$ are identical, and the compressor operation is the same.

In all of the embodiments above described, a common cotrol feature is to select a time period functionally related to the compressor on-off cycle, and then to prevent the application of a turn-off signal to the compressor only if the established time period has not yet elapsed.

While the above description of the preferred embodiments has been made with particular refefence to a single stage refrigeration system, it should be appreciated that the pressure controlling method and apparatus herein disclosed and described may be utilized in controlling the pressure or capacity of any single stage cooling system. Accordingly, numerous variations and modifications may be made in the methods and structures heredescribed without departing from the present invention.

We claim:

1. A method of controlling the system refrigerant pressure in a single compressor refrigeration system, comprising the steps of
   establishing a selected period functionally related to the compressor on-off cycle,
   establishing an operating suction pressure range, detecting the suction pressure in the system for determining when upper and lower limits of said operating pressure range have been exceeded,
   applying a compressor turn-on signal to the compressor in response to exceeding said upper limit of said operating pressure range,
   operating the compressor in the system in response to applying said turn-on signal,
   determining when said lower limit of said operating pressure range has been exceeded for generating a compressor turn-off signal, and
   preventing the application of said turn-off signal to the compressor only if said established selected period has not elapsed 2. The method as described in claim 1, including the additional steps of
   establishing a selected turn-on delay time period, and
   preventing the application of said turn-on signal to the compressor for said turn-on delay time period.

3. Apparatus for controlling the system refrigerant pressure in a single refrigeration compressor system, comprising
   timing means for establishing a selected time period functionally related to the compressor on-off cycle,
   means for establishing and detecting an operating suction pressure range in the system for determining when upper and lower limits of said operating pressure range have been exceeded,
   means for generating a compressor turn-on signal in response to exceeding said upper limit of said operating pressure range,
   means for generating a compressor turn-off signal in response to exceeding said lower limit of said operating pressure range, and
   control means receiving said compressor turn-on and turn-off signals and cooperating with said timing means for applying said turn-on signal to said compressor when said upper limit of said operating pressure range has been exceeded, and preventing the application of said turn-off signal to the compressor only if said established time period has not elapsed.

4. The apparatus as described in claim 3, further including means for establishing a selected turn-on delay time period for cooperating with said control means and preventing the application of said turn-on signal to the compressor for said turn-on delay time period.

5. A method of averaging the evaporator compartment temperature in a single compressor refrigeration system, comprising the steps of
   establishing a selected time period functionally related to the compressor on-off cycle,
   establishing an operating suction pressure range,
   detecting the suction pressure in the system for determining when upper and lower limits of said operating pressure range have been exceeded,
   applying a compressor turn-on signal to the compressor in response to exceeding said upper limit of said operating pressure range,
   operating the compressor in the system in response to applying said turn-on signal,
   determining when said lower limit of said operating pressure range has been exceeded for generating a compressor turn-on signal,
   preventing the application of said turn-off signal to the compressor only if said established time period has not elapsed, and
   repeating the above steps for successive determinations of when said upper and lower limits of said operating pressure range have been exceeded for averaging over a long time period the actual time that the compressor is turned on and turned off.

6. The method as described in claim 5, including the additional steps of
   establishing a selected turn-on delay time period, and
   preventing the application of said turn-on signal to the compressor for said turn-on delay time period.

7. Apparatus for averaging the evaporator compartment temperature in a single compressor refrigeration system, comprising
   timing means for establishing a selected time period functionally related to the compressor on-off cycle,
   means for establishing and detecting an operating suction pressure range in the system for determining when upper and lower limits of said operating pressure range have been exceeded,
   means for generating a compressor turn-on signal in response to exceeding said upper limit of said operating pressure range,
   means for generating a compressor turn-off signal in response to exceeding said lower limit of said operating pressure range,
   control means receiving said compressor turn-on and turn-off signals for successive determinations of when said upper and lower limits of said operating pressure range have been exceeded and cooperating with said timing means for applying said turn-on signal to said compressor when said upper limit of said operating pressure range has been exceeded, and preventing the application of said turn-off signal to the compressor only if said established time period has not elapsed for averaging over a long time period the actual time that the compressor is turned on and turned off.

* * * * *